(12) United States Patent
Dutton

(10) Patent No.: US 11,275,377 B2
(45) Date of Patent: Mar. 15, 2022

(54) SYSTEM AND METHODOLOGY FOR LIGHT LEVEL AUDIT SAMPLING

(71) Applicant: Trent Dutton, Loganholme (AU)

(72) Inventor: Trent Dutton, Loganholme (AU)

(*) Notice: Subject to any disclaimer, the term of this patent is extended or adjusted under 35 U.S.C. 154(b) by 234 days.

(21) Appl. No.: 16/483,634

(22) PCT Filed: Feb. 22, 2018

(86) PCT No.: PCT/AU2018/050150
§ 371 (c)(1),
(2) Date: Aug. 5, 2019

(87) PCT Pub. No.: WO2018/157197
PCT Pub. Date: Sep. 7, 2018

(65) Prior Publication Data
US 2019/0361445 A1    Nov. 28, 2019

(30) Foreign Application Priority Data
Mar. 3, 2017 (AU) ................................. 2017900727

(51) Int. Cl.
*G05D 1/00* (2006.01)
*G01J 1/02* (2006.01)
*G05D 1/02* (2020.01)

(52) U.S. Cl.
CPC .......... *G05D 1/0094* (2013.01); *G01J 1/0238* (2013.01); *G05D 1/027* (2013.01); *G05D 2201/0207* (2013.01)

(58) Field of Classification Search
CPC ................ G05D 1/0094; G05D 1/027; G05D 2201/0207; G05D 1/0268; G01J 1/0238;
(Continued)

(56) References Cited

U.S. PATENT DOCUMENTS 9,330,710 B2 * 5/2016 Bacom ............... G11B 15/6835
9,513,635 B1   12/2016 Bethke et al.
(Continued)

FOREIGN PATENT DOCUMENTS

CN    203786792 U  *  8/2014
CN    105651379 A  *  6/2016
(Continued)

OTHER PUBLICATIONS

International Search Report dated May 4, 2018 from PCT Application No. PCT/AU2018/050150.

*Primary Examiner* — Khoi H Tran
*Assistant Examiner* — Shahzab Hussain Shah
(74) *Attorney, Agent, or Firm* — Innovation Capital Law Group, LLP; Vic Lin

(57) ABSTRACT

There is provided a microprocessor-controlled rover having light and positioning sensing capabilities for the semiautonomous taking of light level readings in a more accurate manner. In embodiments, the rover comprises a cosine and V lambda corrected light sensor. The system may comprise a control computer which generates a waypoint file comprising a plurality of investigative waypoints within investigative area boundary coordinates, including that which may be configured using an on-screen GIS database interface. The investigative waypoints may be configured appropriately by the control computer, including in accordance with the relevant light audit settings. The waypoint file may be transmitted wirelessly to the rover. As such, the rover moves to each investigative waypoint according to the position sensed by the position sensor and the location specified by each investigative waypoint. At each investigative waypoint, the rover takes light level readings including in manners for enhancing the accuracy thereof.

19 Claims, 2 Drawing Sheets

(58) Field of Classification Search
CPC ...... G01J 1/0266; G01J 1/0242; G01J 1/0228; G01J 1/4204
See application file for complete search history.

(56) References Cited

U.S. PATENT DOCUMENTS

| | | | |
|---|---|---|---|
| 9,717,387 B1* | 8/2017 | Szatmary | A47L 9/009 |
| 9,936,556 B2* | 4/2018 | Chraibi | H05B 47/11 |
| 10,126,747 B1* | 11/2018 | Svec | G05B 19/4189 |
| 10,271,021 B2* | 4/2019 | Smolyanskiy | G02B 27/017 |
| 10,302,483 B2* | 5/2019 | Nagashima | G01J 1/0228 |
| 10,660,185 B2* | 5/2020 | Baker | G06T 7/11 |
| 2014/0146167 A1* | 5/2014 | Friend | G01S 17/74 |
| | | | 348/118 |
| 2015/0202770 A1* | 7/2015 | Patron | G06Q 20/386 |
| | | | 700/245 |
| 2015/0330778 A1* | 11/2015 | Sinha | G01B 21/00 |
| | | | 702/150 |
| 2016/0018559 A1 | 1/2016 | Levien et al. | |
| 2016/0125739 A1* | 5/2016 | Stewart | G01C 21/203 |
| | | | 701/21 |
| 2016/0157414 A1* | 6/2016 | Ackerman | A01B 69/008 |
| | | | 701/25 |
| 2017/0198747 A1* | 7/2017 | Chen | H04N 5/2328 |
| 2017/0276501 A1* | 9/2017 | Wise | G01C 21/20 |
| 2017/0364090 A1* | 12/2017 | Grufman | G05D 1/0214 |
| 2018/0188361 A1* | 7/2018 | Berger | G01S 17/931 |

FOREIGN PATENT DOCUMENTS

| | | | | |
|---|---|---|---|---|
| WO | 2012091814 A2 | 7/2012 | | |
| WO | WO-2015128192 A1 * | 9/2015 | ............. | H05B 47/11 |

\* cited by examiner

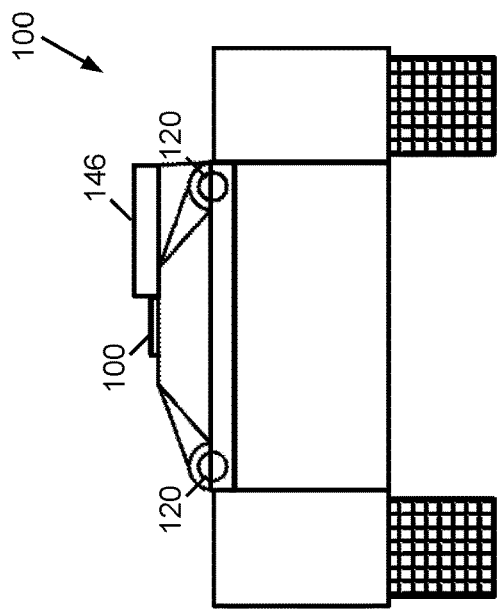
Figure 4
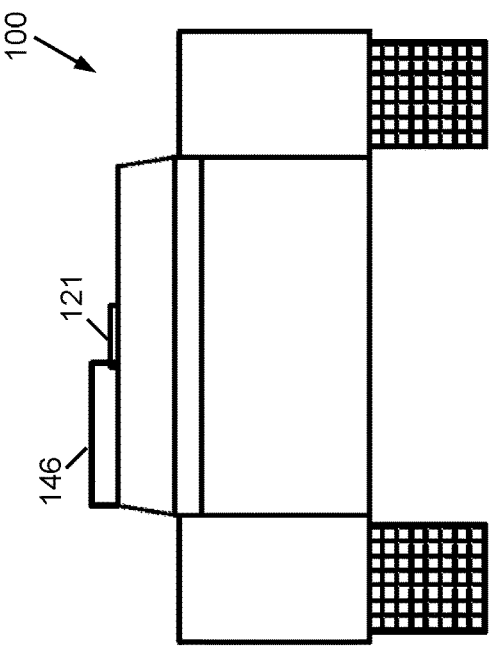
Figure 5
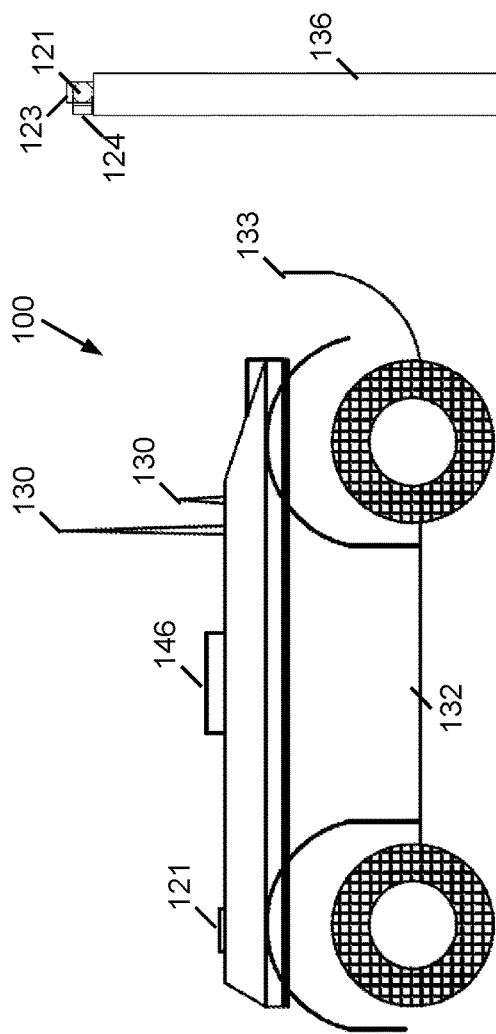
Figure 2
Figure 6
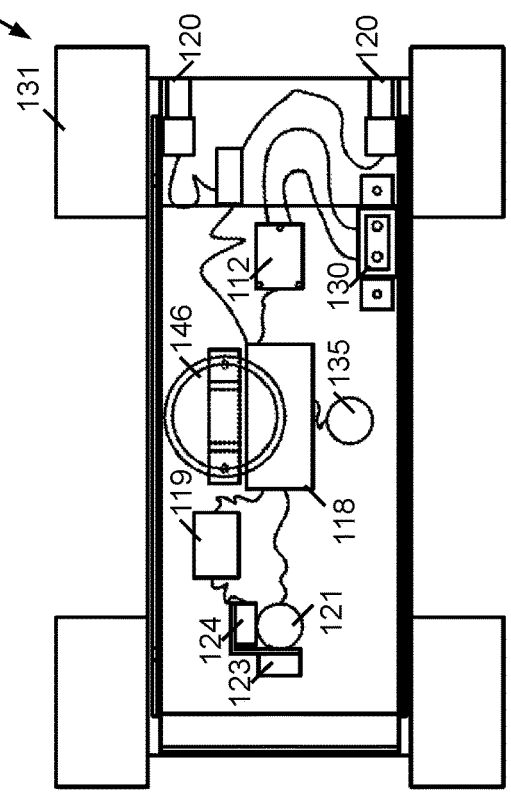
Figure 3

SYSTEM AND METHODOLOGY FOR LIGHT LEVEL AUDIT SAMPLING

FIELD OF THE INVENTION

This invention relates generally to system and methodology for light level audit sampling, such as for sampling sporting field light levels.

BACKGROUND OF THE INVENTION

Large area lighting audits, such as those of sporting fields and the like, is not only time-consuming but also inaccurate.

According to conventional methods, the position of each investigative waypoint is estimated with reference to one or more known objects and a light level readings taken at each waypoint using a handheld light sensor, typically held at arm's length.

However, positioning each waypoint in such a manner is not only time-consuming but also inaccurate. Also, accurate taking of light level readings at each investigative waypoint in such a manner may be hindered by holding the light level sensor at the incorrect elevation, orientating the light sensor inaccurately, casting shadows on the light sensor and the like.

The present invention seeks to provide a way which will overcome or substantially ameliorate at least some of the deficiencies of the prior art, or to at least provide an alternative.

It should be noted that whereas the embodiments herein have been described with reference to a preferred embodiment of sporting field light level audits, such may be applicable to other lighting audit applications also.

It is to be understood that, if any prior art information is referred to herein, such reference does not constitute an admission that the information forms part of the common general knowledge in the art, in Australia or any other country.

SUMMARY OF THE DISCLOSURE

There is provided herein a microprocessor-controlled rover having light and positioning sensing capabilities for the semiautonomous taking of light level readings in a more accurate manner. In embodiments, the rover comprises a cosine and V lambda corrected light sensor.

In one embodiment, the system comprises a control computer which generates a waypoint file comprising a plurality of investigative waypoints within sporting field bound coordinates, including that which may be configured using an on-screen GIS database interface.

The investigative waypoints may be configured appropriately by the control computer, including in accordance with the relevant light audit standards and/or settings.

The waypoint file may be transmitted wirelessly to the rover. As such, the rover moves to each investigative waypoint according to the position sensed by the position sensor and the location specified by each investigative waypoint.

At each investigative waypoint, the rover takes light level readings including in manners for enhancing the accuracy thereof.

For example, in one embodiment, to account for surface undulations, the rover comprises an orientational sensor which may take the form of an inertial measurement unit. The orientational sensor may ascertain and record the orientation (such as the tilt and pitch) of the rover. In this way, in one manner, light level readings taken at inappropriate angles may be discarded. Alternatively, the orientational sensor readings may be recorded within the waypoint file for subsequent post processes by the control computer which may discard the inappropriately taken light level sensor readings.

In additional or alternative embodiments, the system may continuously take light level sensor readings as the rover travels which are averaged within bounded proximities of each investigative waypoint.

In embodiments, the rover comprises a gimbal for controlling the orientation of the light sensor. In embodiments, the gimbal may be utilised for orientational correction of the light sensor according to orientational sensor data readings at each investigative waypoint. Furthermore, in embodiments, the gimbal may be used to orientate the light sensor at various reference points, such as for back-to-camera readings wherein the system calculates a relative orientation for the light sensor given the current position of the rover and the given coordinates of the reference point.

Other aspects are also provided.

As such, the foregoing in mind, in accordance with one aspect, there is provided a system for sampling sporting field light levels, the system comprising: a control computer configured for generating a waypoint file comprising a plurality of investigative waypoints; and a rover in operable communication with the control computer, the rover comprising: a microprocessor for processing digital data; the memory device being in operable communication with the microprocessor and comprising computer program code instruction controllers and a waypoint log data file, a drive subsystem being in operable communication with the microprocessor for driving the rover; a position sensor being in operable communication with the microprocessor for sensing the position of the rover; a light sensor being in operable communication with the microprocessor for sensing light levels wherein, the controllers comprise: a positioning controller for using the position sensor for positioning the rover according to each of the investigative waypoints; a sensing controller for receiving light level data readings from the light sensor and logging the light level data readings in relation to the investigative waypoints.

The controller computer may be configured for transmitting the waypoint file to the rover and, for each of the investigative waypoints of the waypoint file, the sensing controller may be configured for updating an associated light level reading therefor and wherein, post run, the rover may be configured for transmitting an updated waypoint file to the control computer.

The rover may further comprise an orientational sensor and wherein the sensing controller may be configured for receiving orientational data readings from the orientational sensor.

The orientational sensor may comprise an inertial measurement unit.

The sensing controller may be configured for logging the orientational data readings for each of the investigative waypoints.

The system may be configured for comparing each of the orientational data readings according to at least one orientational threshold and discarding light level sensor readings associated with orientational data readings exceeding an orientational threshold.

The orientational threshold may be 1°.

The system may further comprise an orientational actuator in operable communication with the microprocessor and wherein the controller may comprise an orientational controller for controlling an orientation of the light sensor.

The orientational controller may be configured for correctionally adjusting the light sensor according to the orientational data readings.

The orientational controller may be configured for correctional adjusting the light sensor to orientate the light sensor substantially horizontally.

The orientational actuator may comprise a gimbal.

The gimbal may comprise tilt and pitch actuators.

The gimbal may further comprise an elevation actuator.

For a subset of the investigative waypoints, the orientational controller may be configured for controlling the orientational controller to orientate the light sensor towards a reference point.

The orientational controller may be configured for receiving reference point coordinates and calculating relative orientations according to a position of the rover.

The reference point coordinates may comprise latitudinal, longitudinal and coordinates.

The sensing controller may be configured for calculating whether a position of the rover is within proximity of an investigative waypoint when logging light level data readings.

The sensing controller may be configured for continuously sensing light level readings from the light sensor and wherein the system may be configured for averaging the light level readings within respective proximities of each investigative waypoint.

The system may further comprise at least one proximity sensor being in operable communication with the microprocessor for sensing obstacles.

The positioning controller may be configured for detecting an obstacle using the at least one proximity sensor and calculating an avoidance route.

The control computer may comprise a waypoint router configured for receiving bounding region coordinates and calculating the plurality of investigative waypoints within the bounding region.

The waypoint router may be configured for calculating the investigative waypoints in accordance with an interval setting.

The control computer may be configured for displaying GIS data received from a GIS database, receiving on-screen bounding region demarcations thereon and generating the bounding region coordinates according to the on-screen bounding region demarcations.

The light sensor may be mounted atop a telescopic stem.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 2 shows a side elevation view of a rover of the system in accordance with an exemplary embodiment;

FIG. 3 shows a top internal view of the rover in accordance with an embodiment;

FIG. 4 shows a front elevation view of the rover in accordance with an embodiment;

FIG. 5 shows a rear elevation view of the rover in accordance with an embodiment; and FIG. 6 shows a telescopic stem having a light sensor thereatop in accordance with an embodiment.

DESCRIPTION OF EMBODIMENTS

Figure 1:
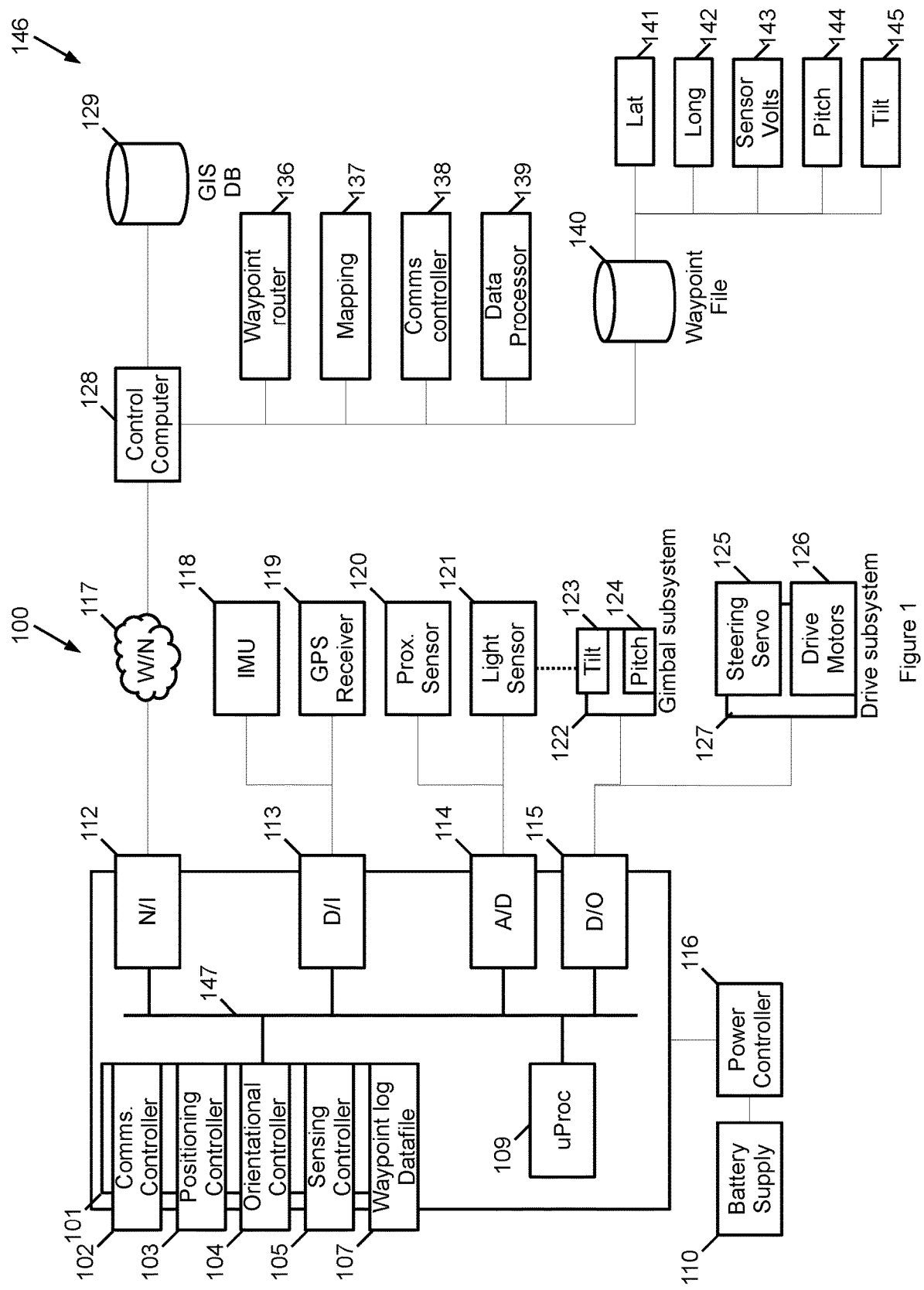
FIG. 1 shows a system for sampling light levels in accordance with an embodiment.

FIG. 1 shows a system 146 for sampling light levels for various applications including for sporting fields.

The system 146 comprises a semiautonomous rover 100 in operable communication with a control computer 128 across a data network, such as a wireless data network 117.

The rover 100 comprises a microprocessor 109 for processing digital data. In operable communication with the microprocessor 109 across a system bus 147 is a memory device 101. The memory device 101 is configured for storing digital data including computer program code controllers including those which will be described hereunder.

The controllers may comprise a communication controller 102 for communication with the control computer 128 across the network 117. In this regard, the rover 100 may comprise a network interface 112, such as a Wi-Fi wireless network interface for communicating across a wireless network 117 with the control computer 128. As will be described in further detail below, the communication controller 102 is configured for receiving waypoint files from the control computer 128 for controlling the operation of the rover 100 in the manner described hereunder.

The rover 100 comprises a battery supply 110 and a power controller 116 for controlling power therefrom.

Furthermore, the rover 100 comprises a drive system 127 in operable communication with the microprocessor including by way of digital outputs 115 for driving the rover 100. The drive subsystem 127 may comprise electric drive motors 126 and a steering servo 125. The drive subsystem 127 may be controlled by the positioning controller 103 which may control the direction and speed of the drive motors 127 and the steering direction of the steering server 125.

The rover 100 further comprises a light sensor 121. In embodiments, the light sensor 121 is a coastline and V lambda corrected (i.e. human visible light only) light sensor 121. In embodiments, light level readings are received from the light sensor 121 as analogue voltage readings which are converted by analogue-to-digital converter 114.

The controllers may comprise a sensing controller 105 for receiving light level readings from the light sensor 121 and, in embodiments, other sensors of the rover 100.

The rover 100 may further comprise a position sensor which, in a preferred embodiment, comprises a GPS receiver 119. However, in other embodiments, other positioning sensors may be employed within the purposive scope of the embodiments described herein including local area laser/acoustic/received signal strength (RSS) position sensors and the like. The microprocessor 109 may interface with a GPS receiver 119 via digital inputs 113.

The controllers may further comprise a positioning controller 103 for ascertaining the position of the rover 100 including in accordance with the waypoints of the waypoint data file in the manner described herein.

In embodiments, the rover 100 may comprise a gimbal subsystem 122 for configuring the orientation of the light sensor 121. In this regard, the gimbal subsystem 122 may comprise actuators 123, 124 for controlling the tilt/roll and pitch of the light sensor 121. In embodiments, a further actuator may control the rotation/yaw of the light sensor 121.

The controllers may comprise an orientation controller 104 for controlling the gimbal subsystem 122. In embodiments, in a first mode of operation when reading ambient light levels, the orientation controller 104 may be configured for keeping the light sensor 121 substantially horizontal for light reading accuracy. In a second mode of operation, the orientation controller 104 may orientate the light sensor 128 at various points of interests, such as for "back-to-camera" light readings.

In embodiments, the rover 100 comprises an inertial measurement unit (IMU) 118. The IMU 118 may measure the specific force, angular rate, and, in embodiments, the magnetic field surrounding the rover 100, using a combination of accelerometers, gyroscopes and/or magnetometers.

In embodiments, the IMU 118 is configured for measuring the pitch and tilt of the rover 100 at various investigative waypoints. In accordance with this embodiment, the sensing controller 105 may be configured for measuring light level readings from the light sensor 121 when the tilt and pitch fall within acceptable thresholds or alternatively record the pitch and tilt readings along with the light level readings for subsequent data processing in the manner described herein.

FIGS. 2-5 show the rover 100 in accordance with an exemplary physical embodiment. As can be seen, in accordance with this particular embodiment, the rover 100 comprises a chassis supported by four wheels of which, for example, the rear pair thereof may be driven by the drive motors 126 and the front pair thereof steered by the steering server 125. It should be noted that variations to the physical drive mechanism are envisaged within the purposive scope of the embodiments provided herein including variations in the number and configuration of wheels, and other mechanisms for propulsion, including flying hovercraft and quad copter propeller propulsion systems.

The lateral side of the chassis may comprise a battery compartment 132 for the access of the batteries 110 therein.

The rover 100 may comprise Wi-Fi antennas 130 for communicating across a wireless network 117 with the control computer 128.

An upper surface of the rover 100 may comprise the light sensor 121 located so as to avoid shadows cast by the other componentry of the rover 100, including the antenna 130.

Furthermore, the upper surface may expose a GPS antenna 146 so as to receive unobstructed GPS signals.

The rover 100 may comprise front bumper protection 130.

With reference to FIG. 3, there is shown the internals of the rover 100 wherein there is shown the GPS receiver 119 and associated GPS antenna 146. There is also shown the light sensor 121 and associated gimbal actuators 123, 124. Also provided is the IMU 118.

The rover 100 may further comprise the wireless network interface 112 and associated Wi-Fi antenna 130.

In embodiments, the rover may comprise proximity sensors 120 which, in an embodiment, may take the form of ultrasonic proximity sensors for collision avoidance. As will be described in further detail below, the positioning controller 103 may comprise collision avoidance capabilities so as to move around on-field obstacles.

In embodiments, the rover 100 may comprise an audio output 135, such as a buzzer or the like so as to output audible control signal for the operator.

Whereas in embodiments the light sensor 121 may be surface flush mounted as is substantially shown in FIG. 2, in embodiments, the light sensor 121 may be located atop a telescopic stem 136 which may, for example, reach 1500 mm upwards. As is shown in FIG. 6, the stem 136 may support the light sensor 121 and associated gimbal control actuators 123, 124 thereon.

Having described the above technical architecture, there will now be described exemplary methodology for sampling sporting field light levels.

The method may comprise generating a waypoint file 140 using the control computer 128. The waypoint file 140 is configured by a waypoint router application 136 which generates a plurality of investigative waypoints, preferably in accordance with AU/NZS2560-2007 clauses 6.3.3 and 6.3.4 (being applicable for football, soccer and AFL sporting field) or other suitable sampling standard.

In embodiments, the bounding coordinates of the sporting field may be input such that the waypoint router 136 places the investigative waypoints appropriately within the interior region thereof. Additional information may be input including desirous light levels, floodlight locations, camera locations and the like. As alluded to above, the camera locations may be utilised for the second mode of back-to-camera light level sensing. In this regard, camera locations may be configured according to X, Y and Z coordinates.

In embodiments, a mapping application 137 may be utilised to more conveniently configure the bounding coordinates of the sporting field. For example, the mapping application 137 may retrieve GIS data from a remote GIS database 129 and may, for example, display satellite or other GIS imagery on an interface. Herein, the operator may mark the bounding regions on the display satellite imagery so as to configure the bounding regions of the sporting field, such as those rectangular, circular, ovular and the like bounds.

As such, the waypoint router application 136 generates the plurality investigative waypoints within the provided bounding regions according to the applicable configuration settings and/or standards. The settings may be configured using the controller computer 128 at runtime, such as, for example, specifying that the investigative waypoints are to be set according to 1×1 m grid intervals.

Thereafter, the waypoint router 136 generates the waypoint file 140 comprising a plurality of investigative waypoint data points which may be specified for example by latitudinal and longitudinal coordinates 141, 142.

Thereafter, the communication controller 130 transmits the so configured waypoint file 140 to the rover 100. The associated communication controller 102 of the rover 100 stores the received waypoint file 140 within the memory device 101 as the waypoint log data file 107.

Having been configured in this manner, the rover 100 is then set to move to the various specified investigative waypoints to take light level readings. Such operation may be initiated by actuating a pushbutton interface of the rover 100 or initiating such from the control computer 128.

As such, during operation, the positioning controller 103 reads each applicable waypoint from the waypoint log data file 107 and controls the drive subsystem 127 to position the rover 100 at or close to the location of the configured waypoint.

In embodiments, a differential GPS transponder may be utilised to counter GPS selective availability inaccuracies.

In one manner, the positioning controller 103 may ascertain the next closest waypoint with reference to the position of the rover 100 (as is ascertained using the GPS receiver 119).

In other in embodiments, the waypoint router 136 (or in embodiments, the positioning controller 103 itself) may generate a travel route to efficiently visit the specified investigative waypoints in order.

For example, for a plurality of investigative waypoints laid out in a grid, the positioning controller 103 may visit each row thereof alternatively from left to right until such time that all waypoints have been visited.

In one embodiment, the sensor controller 105 is configured for sensing light levels from the light sensor 121 when the positioning controller 103 ascertains that the rover 100 is within a threshold proximity of the specified waypoint, such as within a bounding 1 m circle thereof.

In embodiments, the sensing controller 105 may be configured for continuously sensing the light level readings as the rover travels 100. Such continuously measured light levels can thereafter be averaged by subregion by the data processor 139.

In embodiments, the positioning controller 103 may be configured for pausing the rover 100 at or close to each investigative waypoint so as to be able to take a number of readings or an average thereof. However, in other embodiments, the positioning controller 103 may control the rover 100 to travel continuously through the specified investigative waypoints wherein the most appropriate light level reading closest to the specified region is recorded or an average of the light level readings within the proximity of the specified waypoint is recorded.

In embodiments, and especially for the wheeled version of the rover 100 as is substantially shown in FIG. 2 which may transverse undulations and/or unevenness of the sporting field surface, the orientational controller 104 may be configured for controlling the tilt or pitch of the gimbal subsystem 122 for maintaining the light sensor 121 substantially horizontally for light level reading accuracy.

In this regard, the orientational controller 104 continuously receives tilt or pitch readings from the IMU 118 so as to be able to make remedial adjustments using the tilt and pitch actuators 123, 124.

In embodiments, additionally or alternatively, the sensing controller 105 stores the pitch and tilt readings 144, 145 within the waypoint log data file 107. As such, during subsequent processing by the data processor 139, light level readings received for tilt or pitch readings 144, 145 outside acceptable thresholds (such as a 1° threshold) may be discarded.

As alluded to above, certain investigative waypoints may require back to camera readings. As such, at these particular waypoints, the orientational controller 104 may be configured for controlling the tilt or pitch actuators 123, 124 of the gimbal subsystem 122 to orientate the light sensor 121 towards the appropriate camera or the like location. As alluded to above, a camera location may be specified according to latitudinal, longitudinal and elevation coordinates. As such, according to the particular calculated position of the rover 100 as is ascertained using the GPS receiver 119, the orientational controller 104 may calculate the relative tilt, pitch and elevation (such as by using the haversine formula or the like) so as to position the gimbal subsystem 122 to point the light sensor 121 at the appropriate location.

While travelling, the proximity sensors 120 may detect on field objects. In one embodiment, the rover 100 may be configured to stop when detecting an on-field object allowing for manual removal thereof. However, in embodiments, the position controller 103 may calculate a course around the obstacle such as by deviating left or right and then returning on track thereafter.

Upon completion of the sampling run, the communication controller 102 may transmit the stored waypoint log data file 107 back to the control computer 128 across a wireless network 117 for storage within the waypoint file 140.

As can be seen, in embodiments, the waypoint file may comprise a plurality of data points specified by the latitudinal and longitudinal coordinates 141, 142 and, for each waypoint, the sensor voltage 143 (or light level reading derivative thereof). As also alluded to above, the pitch 144 and/or tilt 145 reading as was ascertained using the IMU 118 may also be recorded for each data point.

As alluded to above, the data processor 139 may perform various postprocessing calculations including averaging and filtering.

For example, the data processor 139 may filter the light level readings by discarding light level readings taken at orientations in excess of the acceptable pitch or tilt thresholds.

Furthermore, the data processor 139 may implement averaging by averaging a plurality of light level readings within proximity of each investigative waypoint.

The data processor 139 may also generate a human readable electronic audit report of the results of the light level readings.

It should be noted that various system and functional variations may be made to the system 146 within the purposive scope of the embodiments described herein. For example, in embodiments, as opposed to the rover 100 storing the readings within the waypoint log data file 107 for post run transmission to the control computer 128, the rover 100 may be in continuous communication with the control computer 128 across a wireless network 117 such that light sensor readings are transmitted in substantial real time to the controller computer 128.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for sampling light levels, the system comprising:
   a control computer configured for generating a waypoint file comprising a plurality of investigative waypoints; and
   a rover in operable communication with the control computer, the rover comprising:
   a chassis;
   a microprocessor for processing digital data;
   a memory device being in operable communication with the microprocessor and comprising computer program code instruction controllers and a waypoint log data file,
   a drive subsystem being in operable communication with the microprocessor for driving the rover;
   a position sensor being in operable communication with the microprocessor for sensing the position of the rover;

a light sensor being in operable communication with the microprocessor for sensing light levels, the light sensor being located above the chassis, wherein, the controllers comprise:
  a positioning controller for using the position sensor for positioning the rover according to each of the investigative waypoints;
  a sensing controller for receiving light level data readings from the light sensor and logging the light level data readings in relation to the investigative waypoints; and
  an orientational sensor and wherein the sensing controller is configured for receiving orientational data readings from the orientational sensor;
  an orientational actuator in operable communication with the microprocessor and an orientational controller for controlling an orientation of the light sensor with respect to the chassis, and wherein
  the orientational controller is configured for correctionally adjusting the light sensor according to orientational data readings; and
  the orientational controller is configured for correctional adjusting the light sensor to orientate the light sensor substantially horizontally, wherein
the system is configured for comparing each of the orientational data readings according to at least one orientational threshold and discarding light level sensor readings associated with orientational data readings exceeding an orientational threshold.

2. The system as claimed in claim 1, wherein the sensing controller is configured for calculating whether a position of the rover is within proximity of an investigative waypoint when logging light level data readings.

3. The system as claimed in claim 1, wherein the sensing controller is configured for continuously sensing light level readings from the light sensor and wherein the system is configured for averaging the light level readings within respective proximities of each investigative waypoint.

4. A system for sampling light levels, the system comprising:
  a control computer configured for generating a waypoint file comprising a plurality of investigative waypoints; and
  a rover in operable communication with the control computer, the rover comprising:
    a microprocessor for processing digital data;
    a memory device being in operable communication with the microprocessor and comprising computer program code instruction controllers and a waypoint log data file,
    a drive subsystem being in operable communication with the microprocessor for driving the rover;
    a position sensor being in operable communication with the microprocessor for sensing the position of the rover;
    a light sensor being in operable communication with the microprocessor for sensing light levels wherein, the controllers comprise:
      a positioning controller for using the position sensor for positioning the rover according to each of the investigative waypoints;
      a sensing controller for receiving light level data readings from the light sensor and logging the light level data readings in relation to the investigative waypoints; and
      an orientational sensor and wherein the sensing controller is configured for receiving orientational data readings from the orientational sensor, wherein
    the system is configured for comparing each of the orientational data readings according to at least one orientational threshold and discarding light level sensor readings associated with orientational data readings exceeding an orientational threshold.

5. The system as claimed in claim 4, wherein the controller computer is configured for transmitting the waypoint file to the rover and, for each of the investigative waypoints of the waypoint file, the sensing controller is configured for updating an associated light level reading therefor and wherein, post run, the rover is configured for transmitting an updated waypoint file to the control computer.

6. The system as claimed in claim 4, wherein the orientational sensor comprises an inertial measurement unit.

7. The system as claimed in claim 4, wherein the sensing controller is configured for logging the orientational data readings for each of the investigative waypoints.

8. The system as claimed in claim 4, wherein the orientational threshold is approximately 1°.

9. The system as claimed in claim 4, wherein the orientational actuator comprises a gimbal.

10. The system as claimed in claim 9, wherein the gimbal comprises tilt and pitch actuators.

11. The system as claimed in claim 10, wherein the gimbal further comprises an elevation actuator.

12. The system as claimed in claim 11, wherein, for a subset of the investigative waypoints, the orientational controller is configured for controlling the orientational controller to orientate the light sensor towards a reference point.

13. The system as claimed in claim 12, wherein the orientational controller is configured for receiving reference point coordinates and calculating relative orientations according to a position of the rover.

14. The system as claimed in claim 4, further comprising at least one proximity sensor being in operable communication with the microprocessor for sensing obstacles.

15. The system as claimed in claim 14, wherein the positioning controller is configured for detecting an obstacle using the at least one proximity sensor and calculating an avoidance route.

16. The system as claimed in claim 4, wherein the control computer comprises a waypoint router configured for receiving bounding region coordinates and calculating the plurality of investigative waypoints within the bounding region.

17. The system as claimed in claim 16, wherein the waypoint router is configured for calculating the investigative waypoints in accordance with an interval setting.

18. The system as claimed in claim 16, wherein the control computer is configured for displaying GIS data received from a GIS database, receiving on-screen bounding region demarcations thereon and generating the bounding region coordinates according to the on-screen bounding region demarcations.

19. The system as claimed in claim 4, wherein the light sensor is mounted atop a telescopic stem.

* * * * *